US006367957B1

(12) United States Patent
Hering et al.

(10) Patent No.: US 6,367,957 B1
(45) Date of Patent: Apr. 9, 2002

(54) LIGHTING, ESPECIALLY FOR MOTOR VEHICLES

(75) Inventors: Oliver Hering, Bietigheim-Bissingen; Reiner Lendle, Hassmersheim, both of (DE)

(73) Assignee: Valeo Beleuchtung Deutschland GmbH (DE)

( * ) Notice: Subject to any disclaimer, the term of this patent is extended or adjusted under 35 U.S.C. 154(b) by 0 days.

(21) Appl. No.: 09/517,208

(22) Filed: Mar. 2, 2000

(51) Int. Cl.[7] .............................. F21V 9/00; F21V 7/04; G02B 6/00

(52) U.S. Cl. ........................................ 362/511; 362/551

(58) Field of Search ................................. 362/511, 560, 362/26, 327, 31, 551, 555, 242, 243, 27

(56) References Cited

U.S. PATENT DOCUMENTS

| | | | | | |
|---|---|---|---|---|---|
| 5,184,883 | A | * | 2/1993 | Finch et al. | 362/511 |
| 5,669,693 | A | * | 9/1997 | Smith | 362/31 |
| 6,048,071 | A | * | 4/2000 | Sawayama | 362/31 |

FOREIGN PATENT DOCUMENTS

| | | |
|---|---|---|
| DE | 41 29 094 | 3/1993 |
| DE | 196 21 148 | 12/1997 |

* cited by examiner

*Primary Examiner*—Sandra O'Shea
*Assistant Examiner*—Bao Truong
(74) *Attorney, Agent, or Firm*—Young & Basile, P.C.

(57) ABSTRACT

The invention is lighting that has at least one light-conducting rod, which features at least one light inlet surface and a light outlet surface, and a light source, wherein the light inlet surface is inclined with respect to the longitudinal axis of the light-conducting rod.

17 Claims, 1 Drawing Sheet

II
30
16
10
14
24
12
26
22
18, 20
32
β
α

28
26
18, 20
22
14

LIGHTING, ESPECIALLY FOR MOTOR VEHICLES

BACKGROUND OF THE INVENTION

1. Field of the Invention

The invention pertains to lighting, especially for motor vehicles, with at least one light-conducting rod, which features one or more front-side light inlet surfaces and one or more light outlet surfaces, especially along the light-conducting rod, and with one or more light sources designed especially as light-emitting diodes.

2. Description of the Art

Lighting with light-conducting rods is already sufficiently well-known. For example, DE 41 29 094 A1 discloses a signaling lamp for motor vehicles, in which several light-conducting rods are arranged in parallel to each other. In these light-conducting rods, light is emitted by means of a light-emitting diode at the front end, and this light is distributed along the length of the light-conducting rod. On the side opposite the light outlet surface, the light-conducting rod is equipped with a number of prisms that deflect the light beams in the direction of the light outlet surface.

It turns out that especially with parallel light-conducting rods located side by side, the design must be chosen carefully so that the light inlet surfaces are located in a single plane. Then the individual light sources, especially the light-emitting diodes, can be placed on a common circuit board, so that the design and assembly expense will be reduced to a minimum.

However, lighting is also known in which parallel light-conducting rods are used which are positioned in parallel and side by side, but in which the light inlet surfaces do not rest in a single plane, but rather are laterally offset, since this is required by the shape of the lighting. In these lamps, e.g., with a trapezoidal or parallelogram-shaped lighting glass, the individual light sources cannot be mounted on a common board since it would then have to be designed like a staircase. The individual light sources are thus each attached to a separate board, and for each board the lighting housing must be equipped with a holder or mount for the board. This configuration is complicated and, thus, cost-intensive both from a design and an assembly point of view.

Therefore, the invention is based on the problem of producing lighting which has a simple design and is also quick to assemble. In particular, the light-conducting rods should be positioned in parallel to each other so that the light inlet surfaces are not in a single plane, but rather are offset to each other step-like.

SUMMARY OF THE INVENTION

This problem in lighting of the kind described above is solved by this invention in that the light inlet surface is inclined with respect to the longitudinal axis of the light-conducting rod.

Due to the inclination of the light inlet surface of the light-conducting rod with respect to its longitudinal axis, the effect is that the light beams incident to the light inlet surface will not only be split, but the split beams will also be deflected in the direction of the incline. In other words, this means that the light beams emanating from the light source, due to the slope of the light inlet surface, will also be deflected towards this direction of inclination. In this manner it is possible to interfere with the beam path of the light beams within the light-conducting rod. The lighting according to this invention can be used for signal lamps, interior lighting modules, vehicle marker lamps or in vehicle lighting applications.

With regard to the lighting mentioned above, the geometric arrangement of the light-conducting rods requires a non-planar arrangement of the light outlet surfaces and a simple configuration is proposed which allows the holding and contacting of the light sources for the light-conducting rods in one plane and, thus, allows the use of a simple circuit board, for example. The result is that the structure is nonetheless simple and the lighting is fast to assemble and low in cost.

In one refinement of the invention, the axis of the light cone and/or the central axis of the light source is inclined with respect to the longitudinal axis of the light-conducting rod. In this manner, an additional possibility is created for changing the path of the light beams within the light-conducting rod. However, due to the inclination of the light source in this configuration, the direction of the beams incident to the light inlet surface will be changed.

One preferred design embodiment of the invention provides that the direction of inclination of the light inlet surfaces and the inclination of the light source are selected so at least the light beams within the light-conducting rod follow the same path as the light beams that are emitted normally in conventional light-conducting rods.

In this manner the light source can be inclined, i.e., positioned at an angle, wherein the path of the light beams within the light-conducting rod is corrected by the slope of the light inlet surface. Based on the inclination of the light sources, however, the boards on which the light source or the light sources are located can be arranged at an incline. Thus, it is not necessary that the light inlet surfaces of all light-conducting rods rest in one plane perpendicular to the rod's longitudinal axis. Rather, the ends of the light-conducting rods can follow the slope of the board, so that based on this alignment of the light-conducting rods, for example, even trapezoidal-shaped tail lights can be optimally lighted without having to use a separate board for each individual light source.

Preferably, the directions of inclination of the light inlet surfaces and of the axis of the light cone of the light sources are mutually opposite with respect to the longitudinal axis of the light-conducting rod. For instance, if the light inlet surfaces are inclined to the right, then the associated light source is inclined to the left. The result is that the light beams within the light-conducting rod experience little or no changes in direction.

In the case of a light source that is emitting parallel light, for example, the relationship between the angle α which is the direction of inclination of emission of the light source, and the angle β which is the inclination of the injection surface of the light conductor—wherein the subsequent path of the light beam within the light conductor is defined by the angle τ—can be described by the following formula:

$$\beta = \mathrm{ArcCos}\left[\sqrt{\left(\frac{(n_1\mathrm{Cos}(\alpha) - n_2\mathrm{Cos}(\tau))^2}{n_1^2 + n_2^2 - 2n_1n_2\mathrm{Cos}(\alpha-\tau)}\right)}\right],\ \alpha < 45^\circ$$

where $n_1$: refractive index of medium 1 (e.g., air)

$n_2$: refractive index of medium 2 (e.g., light waveguide)

α: Angle between the incident light beam and the horizontal

τ. angle between light beam in the light conductor and the horizontal

β: angle of the inlet surface

The invention thus describes an arrangement of one or several light-conducting rods wherein one configuration of the particular light inlet surfaces is proposed that makes it possible to arrange the light sources allocated to the light-conducting rod in one plane, in order to use just one single, planar board, for instance. If the individual light-conducting rods have several signal injection surfaces, e.g., on the opposite side, then the same principle can be used.

In one design example, the light inlet surfaces of the light-conducting rods, which are positioned side by side, form a kind of sawtooth profile. This is caused by the fact that the direction of inclination of the light inlet surfaces is opposite the direction of inclination of the light sources.

BRIEF DESCRIPTION OF THE DRAWING

Additional advantages, properties and details of the invention are indicated in the subordinate claims and from the following description in which, with reference to the figures, one particularly preferred design example will be described in detail. In this regard, the properties illustrated in the figures and mentioned in the claims and in the description, are essential to the invention either individually, or in any other combination with each other. Shown are:

DESCRIPTION OF THE PREFERRED EMBODIMENT

Figures 1, 2:
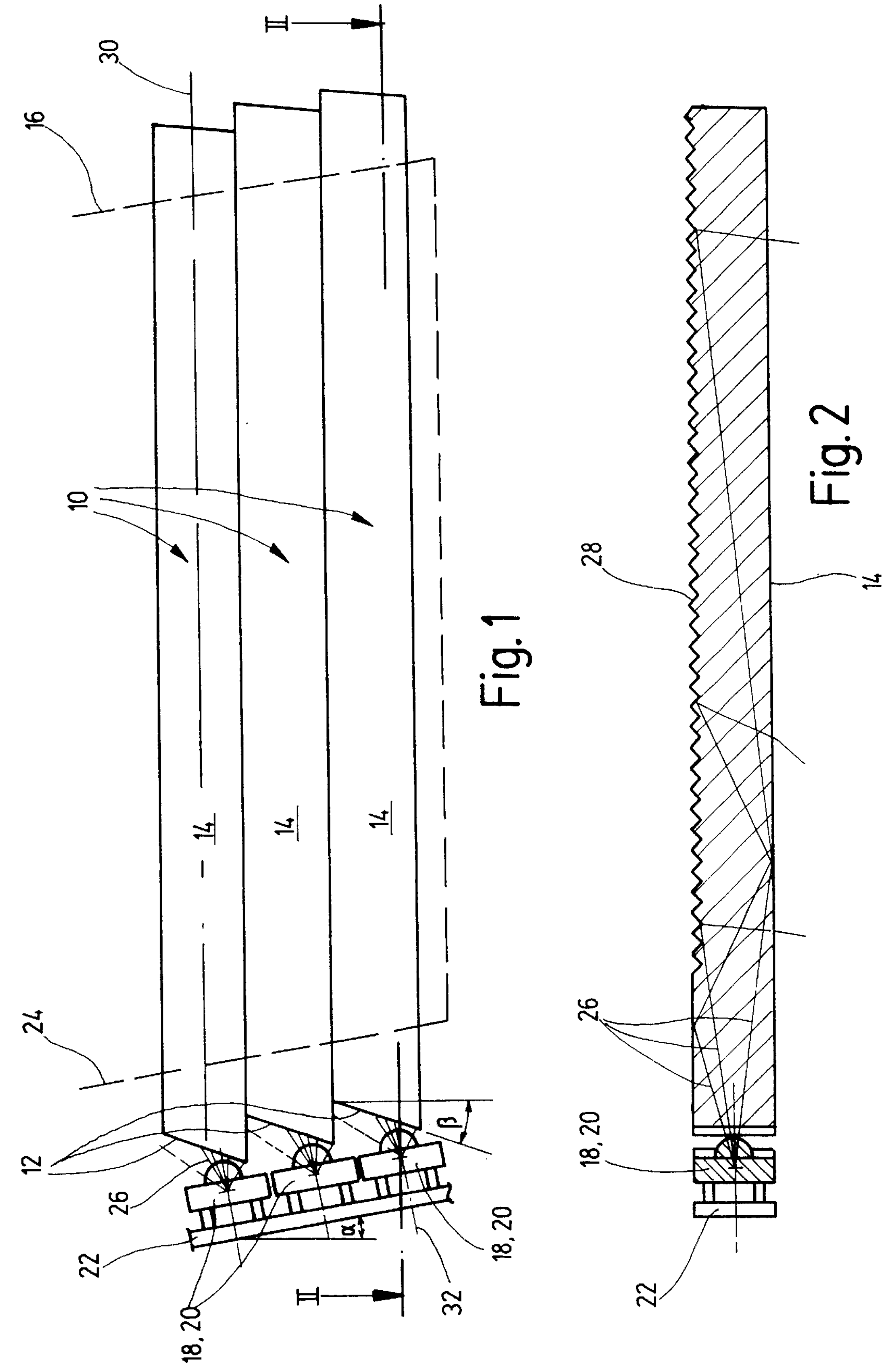
FIG. 1 is a side view of several light-conducting rods arranged side by side behind a trapezoidal lighting glass indicated in the illustration.
FIG. 2 is a cross section along line II—II through the bottom light-conducting rod according to FIG. 1.

FIG. 1 shows a total of three light-conducting rods, each designated by reference number 10. The light-conducting rods 10 are arranged one above the other and each features a light inlet surface 12, which is located on the front-side end. Facing the viewer, the light-conducting rods 10 each feature a light outlet surface 14 located behind a trapezoidal lighting glass 16, which is indicated in the illustration by dashed lines. A light source 18 is allocated to each of the light inlet surfaces 12 and powered by a light-emitting diode 20. These light-emitting diodes 20 are located on a single board 22, and the board 22 is inclined by the angle α with respect to the vertical direction. In this case, the board 22 runs roughly parallel to the neighboring side edge 24 of the lighting glass 16.

The light-emitting diodes 20 each emit light to a corresponding light inlet surface 12 of the particular light-conducting rod 10, and the light inlet surface 12 is likewise inclined. However, the direction of incline is opposite the direction of incline of the board 22. The light inlet surfaces 12 are thus inclined by the angle with respect to the vertical. This means that the light beams 26 of the light-emitting diodes 20, which emit, e.g., a conical light beam, are split at the light inlet surface 12 so that the split beam from the conical axis 32 of the light source runs essentially parallel to the longitudinal axis 30 of the light-conducting rod 10. This means that in spite of the inclined position of the board 22, the beam path within the light-conducting rods 10 is similar to the situation when the light-conducting rods 10 are irradiated with vertical light inlet surfaces 12 with parallel light sources 18.

In this manner, the position of the light-conducting rods 10 can be changed, especially so the light-conducting rods 10 can be shifted in parallel to each other, so that not only rectangular-shaped, but also parallelogram-shaped and trapezoidal-shaped lighting glasses 16 can be illuminated optimally. The light beams 26 that are emitted from the light-emitting diode 20 and that follow paths within the light-conducting rod 10 (FIG. 2) are distributed uniformly across the entire length of the light-conducting rod 10 and are split such that they are incident to prisms 28 located on the side opposite the light outlet surface 14, and from there they are diverted in the direction of the light outlet surface 14.

In this kind of configuration of the light-conducting rods 10, the individual light-emitting diodes 20 can be attached to a single board 22 by soldering, for example, so that only a single board 22 is needed, and this board can be installed relatively quickly or can be replaced rather quickly as needed. Step-like boards or triangular-shaped holding sockets for the light sources 18 are thus no longer necessary.

What is claimed is:

1. Lighting, with at least one light-conducting rod which has at least one light inlet surface and at least one light outlet surface, and with at least one light source, characterized in that the light inlet surface is inclined with respect to a longitudinal axis of the light-conducting rod and the light source is inclined with respect to the longitudinal axis of the light-conducting rod and wherein a direction of inclination of the light inlet surface and a direction of inclination of the light source with respect to the longitudinal axis of the light-conducting rod are mutually opposite each other.

2. Lighting according to claim 1, characterized in that an angle of inclination of the light inlet surface and an angle of inclination of the light source with respect to the longitudinal axis of the light-conducting rod are equal to each other.

3. Lighting according to claim 1, characterized in that an angle of inclination of the light source, an angle of inclination of the light inlet surface and a geometric shape of the light source are dimensioned so that a light beam from a conical axis of the light source runs parallel to the longitudinal axis of the light-conducting rod.

4. Lighting according to claim 1, characterized in that at an angle of inclination of the light source, an angle of inclination of the light inlet surface is dimensioned so that the light beams in the light-conducting rod follow a particular path which is obtained by various requirements of a light distribution.

5. Lighting according to claim 1, characterized in that a plurality of light-conducting rods are positioned side-by-side, and wherein a plurality of light inlet surfaces includes the at least one light inlet surface and wherein a plurality of light sources includes the at least one light source and wherein the plurality of light inlet surfaces is arranged so that the plurality of light sources is located in a single plane.

6. Lighting according to claim 1, characterized in that a plurality of light inlet sues of a plurality of light-conducting rods is positioned side-by-side to form a sawtooth profile.

7. Lighting according to claim 1, characterized in that the inclined light inlet surface has an arbitrary geometric shape.

8. Lighting according to claim 1, characterized in that the cross section of the light-conducting rod is one of round and rectangular.

9. Lighting according to claim 1, characterized in that the at least one light source is at least one light-emitting diode.

10. Lighting, characterized in that a plurality of light-conducting rods are positioned side-by-side, each rod having a light inlet surface and a light outlet surface and a light source, and wherein the light inlet surfaces of the rods form a sawtooth profile.

11. Lighting according to claim 10, characterized in that each light source is a light-emitting diode.

12. Lighting according to claim 10, characterized in that each light inlet surface has an arbitrary geometric shape.

13. Lighting according to claim 10, characterized in that the cross section of each light-conducting rod is one of round and rectangular.

14. Lighting according to claim 10, characterized in that a plurality of light sources allocated to the plurality of light-conducting rods is located in a single plane.

15. Lighting according to claim 10, characterized in that each light inlet surface is inclined with respect to a longitudinal axis of each respective light-conducting rod and each light source is inclined with respect to the longitudinal axis.

16. Lighting according to claim 15, characterized in that a direction of inclination of the light inlet surface rod and a direction of inclination of the light source are opposite with respect to the longitudinal axis of each light-conducting rod.

17. Lighting according to claim 10, characterized in that an angle of inclination of the light source, an angle of inclination of the light inlet surface and a geometric shape of the light source are dimensioned so that a light beam from a conical axis of the light source for each light-conducting rod runs parallel to the longitudinal axis of the respective light-conducting rod.

* * * * *